Patented May 14, 1946

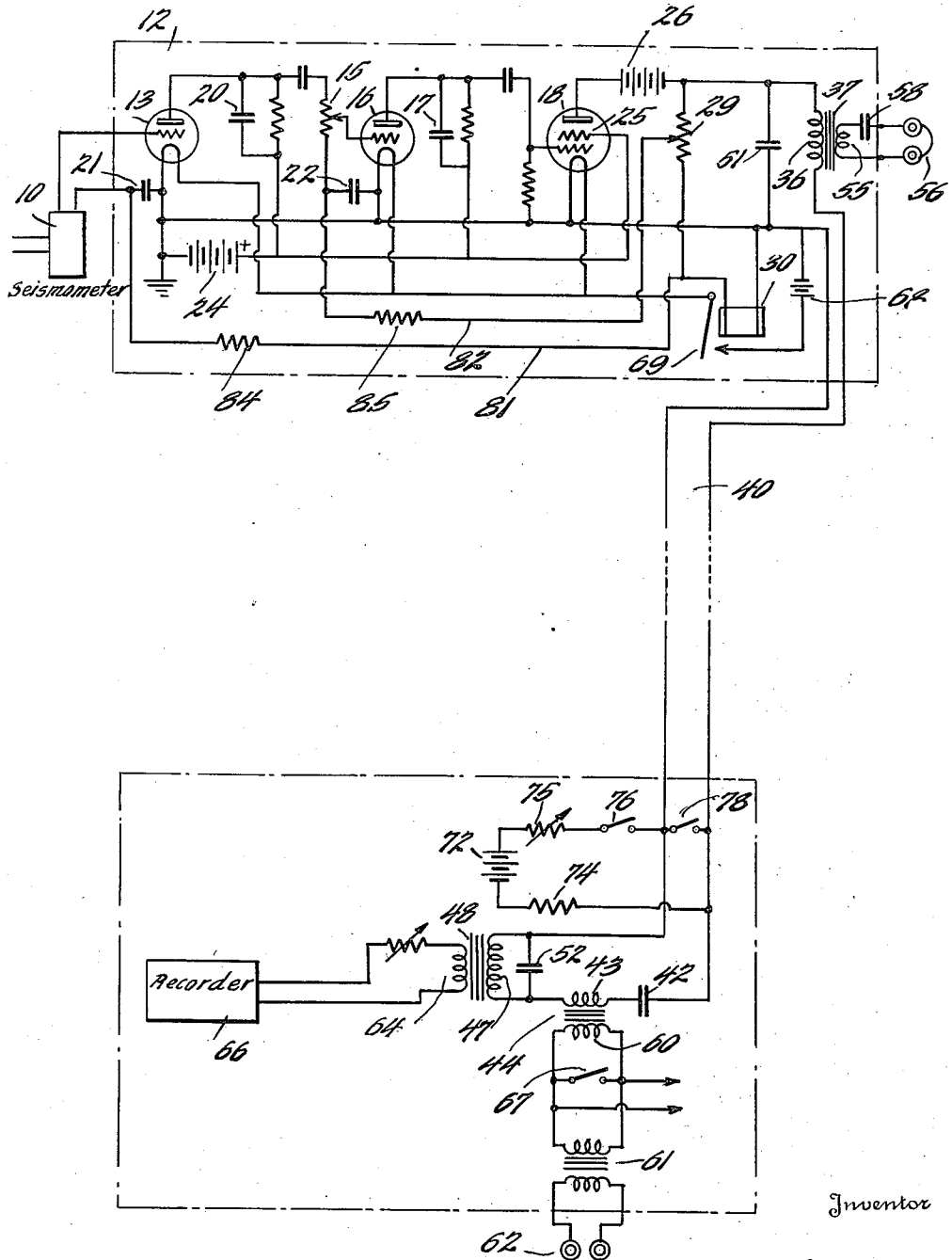

2,400,245

UNITED STATES PATENT OFFICE 2,400,245

SEISMIC SURVEYING

William Harry Mayne, San Antonio, Tex., assignor to Olive S. Petty, San Antonio 6, Tex.

Application January 21, 1944, Serial No. 519,180

3 Claims. (Cl. 177—352)

This invention relates to apparatus for use in seismic surveying and has for its principal object the provision of an improved and simplified form of control for such apparatus, especially adapted for use in controlling and communicating with one or more amplifier units from a remotely disposed recording unit.

Apparatus commonly used in the field of seismic surveying includes as its essential elements the detector or seismometer, the amplifier, and the recorder. A seismic disturbance is initiated by the firing of a charge of explosive at or near the surface of the earth, thereby generating and propagating seismic impulses or waves through the earth. These waves are then picked up at spaced remote points and converted into waveform electrical energy by seismometers. The electrical energy output of each seismometer is then amplified and recorded.

In certain types of seismic work, for instance refraction surveying, the seismometers are spaced at considerable distances and it is therefore preferable, in order to reduce the noise level as much as possible, to locate each amplifier unit near the detector from which it is supplied with energy. The output of each amplifier is then transmitted to a common recording station by a two-conductor cable. It is for use with such a system that the present invention is especially intended since it provides for the control of and communication with the various detector stations from the recording station without requiring the use of additional conductors or cables between these stations, thus reducing the cost of the system and simplifying its maintenance and operation.

More specifically, it is an object of the invention to provide, in a seismic system in which the amplifier and recording stations are remote, communication means and control means operating over the cables which deliver energy from the amplifiers to the recording station. Preferably the control means is of such a nature that from the recording station the amplifiers can be turned on and off, the polarity of the cable conductors checked, the amplifier batteries tested, and the gain of the amplifier controlled.

Further objects and features of the invention will be apparent from the following description taken in connection with the accompanying drawing in which the single figure is a diagrammatic representation of the essential elements of a seismic system, illustrating the application of the invention thereto.

The invention has been illustrated with reference to a system especially designed for use in conducting refraction surveys, for which it is particularly suited, but no limitation of the invention is intended thereby. For the purpose of simplifying the drawing and descriptive matter, one complete unit is shown, it being understood that the usual system involves the employment of a plurality of seismometers disposed in spaced relation, and arranged to function simultaneously to convert the mechanical energy of the seismic impulses into electrical energy, the output of each seismometer being separately amplified, and the amplified energy being delivered to a suitable multiple recorder.

In the drawing the seismometer is shown at 10 and the amplifier for the seismometer at 12. The amplifier is of the usual thermionic valve type, slightly modified to provide the advantages of the instant invention.

Thus the leads from the seismometer are connected respectively to the grid and cathode of a thermionic valve 13. The output of valve 13 is fed through a resistance coupled stage to the grid of a second valve 16, an adjustable contact with the grid resistor 15 being provided in order that the maximum desired gain of the amplifier may thereby be determined. The resistance coupled stage is slightly modified for filtering purposes by the use of a condenser 20 in shunt with the anode resistor, which serves to by-pass undesirable high frequencies, and by the use of condensers 21 and 22 which function as hereinafter more fully explained.

The output of valve 16 is delivered through a second resistance coupled stage to valve 18, a condenser 17, functioning similarly to condenser 20 to reduce undesirable high frequencies, being shunted across the anode resistor. Valves 13 and 16 are supplied with anode voltage from a source 24, which is also used as the source of voltage of a high potential grid 25 in valve 18; the source of anode voltage of valve 18 is indicated at 26.

It will be appreciated that the structure so far described is conventional, and that the details thereof form no essential part of the instant invention but may be widely modified within the limits of appropriate amplifier design.

The anode current from valve 18 is fed through resistor 29 and through the winding of a relay 30 to the cathodes of the several valves. Fluctuations in energy supplied to the amplifier cause a pulsating current to flow from the anode of valve 18 through primary winding 36 of telephone transformer 37 into one conductor of the two-conductor output cable 40 which extends from the amplifier to the recording station; the length of this cable may be of the order of from 1500 to 5000 feet. At the recording station, the pulsating signal is passed through condenser 42, serving to block direct current, through the primary winding 43 of telephone transformer 44, thence through primary winding 47 of output transformer 48 and back through the other conductor of the cable 40 to the valve cathodes. Condensers 51 and 52 are arranged in shunt in the circuit which is described, the impedance of these condensers being relatively high so that they introduce little loss so far as the low frequency wave form energy is concerned, but freely pass voice current flowing in the circuit through the primary windings of the telephone transformers 37 and 44. These windings, 36 and 43, are so designed that they offer very low impedance to the low frequency seismic energy. The secondary winding 55 of telephone transformer 37 is connected to a telephone set indicated generally at 56, a series condenser 58 being employed to impede the flow in this circuit of frequencies of the order of seismic frequencies. The secondary winding 60 of telephone transformer 44 is connected through a transformer 61 to a second telephone set 62 at the recording station, and the winding 60 may be connected in parallel with the windings of transformers similar to transformer 44 which are similarly connected with the two-conductor cables running to the recording station from other amplifiers. The telephone sets 56 and 62 may be of the voice actuated type, the showing in the drawing being diagrammatic. A switch 67 in shunt with the primary winding of transformer 61 may be closed to interrupt telephonic communication.

The secondary winding 64 of output transformer 48 is connected to energize a moving element in the multiple recorder 66, other moving elements of this recorder being similarly fed with wave form energy received from other amplifiers.

It will be appreciated that by the use of the circuits just described, voice communication may be held between each amplifier and the recording station through the output cable associated with that amplifier, the construction being such that seismic energy and voice signals are not affected one by the other but are effectively segregated by the several filters employed. It is found that with the use of this arrangement and without substantial added expense or increased difficulty in handling the cables, the speed of field operations can be tremendously increased, since it is frequently necessary to establish communication between the operator at the recording station and operators stationed at the various points of detection and amplification of the seismic impulses. This feature of the invention is especially valuable in refraction work where distances between the parties may be of the order of 5000 feet or more.

In order to reduce the cost of cables and to facilitate the handling of the equipment, it is helpful in refraction surveying to locate the amplifier batteries or voltage sources at the amplifier, but frequent replacement of these batteries is necessary unless care is exercised to disconnect them when the amplifiers are not in actual use for the amplification of seismic energy. It is therefore a feature of the invention that any of the amplifiers may be turned on or off from the recording station. It is also desirable to effect control of the amplifier gain from the recording station. These results are achieved as now described by the use of the same output cable 40.

The heating or cathode current for the amplifier valves is provided by a source of voltage 68 which is connected to the valves through a switch 69 forming part of the relay. As above noted, the direct current from the anode valve 18 flows through the winding 30 of this relay. A source of voltage 72, located at the recording station, is also connected to supply current to the relay winding 30 through the conducting cable 40, switch 76, and resistances 74 and 75. When the switch 76 is closed, current flows in the winding 30 and the switch 69 is thereby closed to heat the cathodes of the valves. When the cathodes are heated to a temperature sufficiently high to cause flow of anode current in the valves, the anode current from valve 18 flows through the winding 30 and thus maintains the switch 69 closed, so that switch 76 may thereafter be opened without interrupting the operation of the amplifier. If it is desired to discontinue operation of the amplifier, switch 78 may be closed to short circuit resistor 29 and relay winding 30, and on cooling of the cathodes and resultant interruption of anode current, the switch 78 may be opened, leaving the amplifier turned off.

Similarly, the gain of the amplifier can be controlled from the recording station by closing switch 76 and varying resistor 75, to thereby vary the voltage applied by the source 72 across resistor 29 and winding 30. Suitable increments of the voltage thus applied are then returned through leads 81 and 82 and resistors 84 and 85 to the grids of valves 13 and 16. The polarity of source 72 is preferably such that on reduction of the effective value of the resistor 75, these grids are rendered more negative so that the gain of the amplifier may be suitably reduced from the maximum gain determined by the setting of the variable contact from the grid of valve 16 to resistor 15. Condensers 21 and 22 function to by-pass any audio components of the output appearing across resistor 29 and winding 30, thus effectively blocking from the amplifier the seismic and voice frequencies transmitted through cable 40 while permitting the feeding to the amplifier of the gain control voltage established at the recording station. Valves 13 and 16 are preferably of the variable Mu type, valve 13 having a relatively close cutoff and valve 16 having a remote cutoff. Thus by returning the grids of these valves to proper points in the circuit through the leads 81 and 82, it is possible to obtain the desired reduction of gain in each stage without overloading the subsequent stage.

Alternatively, a pentode tube may be employed in lieu of the variable resistor 75, it being possible to obtain thereby a very high variable resistance while maintaining appreciable current flow in the circuit. The output of the pentode tube, when so used, can be controlled in any conventional manner, for example, by control of grid bias.

The two-conductor cable 40 may be replaced by a single conductor, return being effected through the ground. In such event, the ground is considered the second conductor for the purposes of the present invention.

It will be perceived from the foregoing that the invention contemplates, among other features, the provision of means affording telephonic communication and amplifier gain control by way of the output cable which feeds the amplified seismic signal to the recorder, in combination with means blocking from the amplifier both the seismic and the voice frequencies flowing in the output cable, so that only the gain control voltage established at the recording station is fed back into the amplifier.

Having thus described the invention, what is claimed as new and desired to be secured by Letters Patent is:

1. In apparatus for use in seismic surveying, the combination with a seismometer for converting seismic impulses to electrical energy, a thermionic valve amplifier for such energy, and a recorder at a remotely located recording station for recording the amplified energy, of two conductors affording a path over which the amplified energy is transmitted from the amplifier to the recorder, voice frequency transmitting and receiving element located adjacent the amplifier and the recording station and operatively connected through said conductors, means associated with said conductors for inhibiting the effect of seismic frequencies on said elements and of voice frequencies on said recorder, gain control means associated with said amplifier, said gain control means including connections to the valve grids for applying thereto a variable bias voltage, means at the recording station operatively connected through said conductors with said gain control means to provide the said bias voltage and thereby to effect regulation from said recording station of the amplifier gain, and filter means associated with said gain control means for blocking from the amplifier the energy of voice and seismic frequencies transmitted through said conductors while permitting the application to said grids of the bias voltage provided at the recording station.

2. In apparatus for use in seismic surveying, the combination with a seismometer for converting seismic impulses to electrical energy, an amplifier for such energy, and a recorder at a remotely located recording station for recording the amplified energy, of two conductors affording a path over which the amplified energy is transmitted from the amplifier to the recorder, voice frequency transmitting and receiving elements located adjacent the amplifier and the recording station and operatively connected through said conductors, means associated with said conductors for inhibiting the effect of seismic frequencies on said elements and of voice frequencies on said recorder, gain control means associated with said amplifier, means at said recording station operatively connected through said conductors with said gain control means to effect regulation from said recording station of the amplifier gain, and filter means associated with said gain control means for blocking from the amplifier the energy of voice and seismic frequencies transmitted through said conductors.

3. In apparatus for use in seismic surveying, the combination with a seismometer for converting seismic impulses to electrical energy, a thermionic valve amplifier for such energy, and a recorder at a remotely located recording station for recording the amplified energy, of two conductors affording a path over which the amplified energy is transmitted from the amplifier to the recorder, gain control means associated with said amplifier, said gain control means including connections to the valve grids for applying thereto a variable bias voltage, means at the recording station operatively connected through said conductors with said gain control means to provide the said bias voltage and thereby to effect regulation from said recording station of the amplifier gain, and filter means associated with said gain control means for blocking from the amplifier the energy of seismic frequencies transmitted through said conductors while permitting the application to said grids of the bias voltage provided at the recording station.

WILLIAM HARRY MAYNE.